Oct. 29, 1929.  J. M. BODENSIEK  1,733,444
HOSE SUPPORTER GRIPPING DEVICE
Filed Aug. 18, 1928
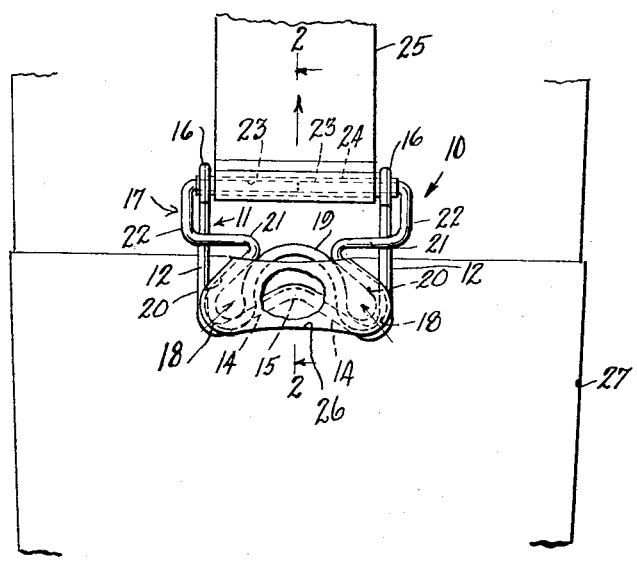
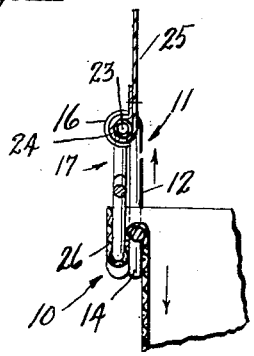
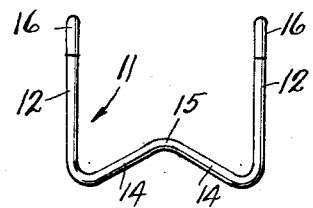
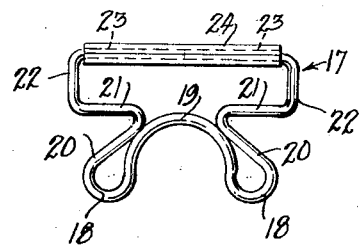
Inventor
Jennie M. Bodensiek
By her Attorney Patented Oct. 29, 1929

1,733,444

UNITED STATES PATENT OFFICE

JENNIE M. BODENSIEK, OF NEW YORK, N. Y.

HOSE-SUPPORTER GRIPPING DEVICE

Application filed August 18, 1928. Serial No. 300,451.

This invention relates to improvements in gripping devices for use in connection with hose supporters.

The devices now commonly used for this purpose consist of a clasp the base of which has a button riveted therein and a yoke in engagement therewith, the hose being clasped between the said button and yoke. The disadvantages of such an arrangement are, that the buttons become loose in the base and cause the stocking or hose to be caught between the button and the base and thus cause a drop stitch or run therein, especially if it is a fine silk hose. Another disadvantage is that a clasp of this nature puts a strain on the hose in one straight line, and when the stocking thus supported comes in contact with any rough surfaces a run therein will be caused.

My invention has for one of its objects the provision of a hose supported gripping device that will overcome these disadvantageous features.

For this purpose my invention consists of a base, which swingingly supports a hose gripping member preferably provided with two diverging clamping and strain distributing loops. The said base and clamping member are adapted to coact with each other to securely grip the stocking and evenly distribute the strain thereon so that under no condition can a run in the stocking be caused thereby.

Another object is to produce a device of the character described in which the maximum simplicity of construction and operation is secured.

Other objects and advantages will appear as the nature of the improvements is better understood, the invention consisting substantially in the novel arrangement and co-relation of parts herein fully described, and illustrated in the accompanying drawings, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purposes of illustration, is shown in the accompanying drawings, in which Figure 1 is a front view in elevation of my invention as applied to a stocking.

Fig. 2 is a sectional view on line 2—2 Fig. 1.

Fig. 3 is a detail view of the base or hose supporting member and

Fig. 4 is a detail view of the hose gripping member.

Referring to the drawings in detail 10 indicates my improved gripping device, provided with a hose supporting or base member 11 consisting of a pair of parallel bars or arms 12 connected at their lower ends by inclined or angular arms 14 joined by an arcuate portion 15. The said arms 12 terminate at their upper ends in loops 16. Swingingly supported in the loops 16 is a hose gripping member 17 preferably bent up of a single piece of wire. The said gripping member is provided at its lower end with a pair of diverging loops 18 connected by a curved or arcuate portion 19, the said loops are also provided with angularly disposed sections 20 sloping upwardly and inwardly and preferably contact with the arcuate portion 19 at a tangent thereto. Horizontal portions 21 are bent outwardly from the sections 20, and vertical arms 22 are bent upwardly from the portions 21. Horizontal arms 23 are bent inwardly from the arms 22 and are covered by a tubular cap 24 to which is attached the usual garter ribbon 25.

The operation of the device is as follows:—

The gripping member 17 is swung upwardly, a portion 26 of the selvage edge of the stocking 27 is bent downwardly over the arms 14 and brought upwardly over the loops 16 and the member 17 is then swung downwardly against the base 11 in which position the stocking portion 26 will be firmly gripped. The upward pull of the garter ribbon 25 and the downward pressure of the foot on the stocking 27 will cause the above mentioned gripping action, the greater the upward pull of the garter the greater the gripping action.

It will be readily understood by referring to the drawings that due to the fact that the loops 18 diverge in a circumferential direction the strain on the stocking will be spread out in that direction and thus avoid excessive strain in one direction on the stocking which is one of the chief causes of runs in the stocking, likewise due to the angularity of the loop arms 20, substantial resisting surfaces are provided against which the stocking is drawn by the ribbon 25. It will also be understood that the arrangement of the arms 14 of the base member 11 provides a substantial frictional hose supporting medium and prevents the stocking from pulling out from between the members 11 and 17.

From the above it will be seen that I have provided a simple and efficient hose gripping device which will firmly grip the stocking without injury thereto.

It will also be obvious that by the use of my improved flat buttonless gripping device, I obviate the disadvantages inherent in the button type of grippers, for instance, the heads of such buttons often press against the soft part of the flesh of the limb, when the wearer is in sitting position, where such device is used to grip the rear of the stocking.

Having described my invention what I claim as new and desire to secure by Letters Patent is—

1. A hose supporter gripping device, comprising a base, the base comprising a pair of parallel arms, a pair of angularly disposed arms connecting the parallel arms and connected to each other, a gripping member hingedly mounted at one end thereof on the base, and a pair of loops at an angle to each other at the opposite end of the gripping member coacting with the parallel and angular disposed arms on the base to form a bite to grip the hose.

2. A hose supporter gripping and strain distributing device, comprising a base member, a substantially inverted V shaped hose supporting section at the bottom of the base, a second member hingedly supported on the base, and a pair of diverging loops on the said second member coacting with the hose supporting section to grip the hose and distribute the strain thereon.

3. In a hose supporting device, a base comprising a pair of parallel arms, and a substantially inverted V shaped hose supporting section connecting the said arms, a second member hingedly supported on the base, and a pair of diverging loops on the said second member cooperating with the hose supporting section to form a bite to grip the hose.

4. A hose supporting and strain distributing device, comprising a pair of hingedly mounted members, a substantially inverted V shaped hose supporting section on one of the members, and a pair of diverging loops on the other member cooperating with the hose supporting section to form a bite to grip the hose and distribute the strain thereon.

5. In a hose supporting device, a base comprising a pair of parallel arms, and a substantially inverted V shaped hose supporting section connecting the said arms, a second member hingedly supported on the base, a pair of diverging loops on the said second member cooperating with the hose supporting section to form a bite to grip the hose and an arm on each of the loops tapering inwardly and upwardly to form pull resisting surfaces.

JENNIE M. BODENSIEK.